US010819779B2

(12) United States Patent
Botticelli (10) Patent No.: US 10,819,779 B2
(45) Date of Patent: Oct. 27, 2020

(54) VEHICLE DATA SYSTEM UTILIZING PUBLISH/SUBSCRIBE GATEWAYS

(71) Applicant: Trimble Inc., Sunnyvale, CA (US)

(72) Inventor: Mark Philip Botticelli, North Grafton, MA (US)

(73) Assignee: Trimble Inc., Sunnyvale, CA (US)

( * ) Notice: Subject to any disclaimer, the term of this patent is extended or adjusted under 35 U.S.C. 154(b) by 281 days.

(21) Appl. No.: 14/829,001

(22) Filed: Aug. 18, 2015

(65) Prior Publication Data

US 2016/0050269 A1    Feb. 18, 2016

Related U.S. Application Data

(60) Provisional application No. 62/038,592, filed on Aug. 18, 2014.

(51) Int. Cl.
| | |
|---|---|
| H04L 29/08 | (2006.01) |
| H04W 4/06 | (2009.01) |
| H04W 4/021 | (2018.01) |
| G08G 1/00 | (2006.01) |
| G06F 16/29 | (2019.01) |

(52) U.S. Cl.
CPC .......... H04L 67/1076 (2013.01); G06F 16/29 (2019.01); G08G 1/205 (2013.01); H04L 67/12 (2013.01); H04W 4/021 (2013.01); H04W 4/06 (2013.01)

(58) Field of Classification Search
CPC ..... H04L 67/1076; H04L 67/12; H04L 16/29; G08G 1/205; G06F 17/30241; H04W 4/06; H04W 4/021
See application file for complete search history.

(56) References Cited

U.S. PATENT DOCUMENTS

| | | | | |
|---|---|---|---|---|
| 5,774,825 | A * | 6/1998 | Reynolds | B60R 25/102 340/989 |
| 5,794,174 | A * | 8/1998 | Janky | B60R 25/102 340/989 |
| 8,655,307 | B1* | 2/2014 | Walker | H04W 52/0212 455/405 |
| 8,838,088 | B1* | 9/2014 | Henn | H04M 3/568 455/411 |
| 9,432,437 | B1* | 8/2016 | Leonard | H04L 67/02 |
| 2008/0319666 | A1 | 12/2008 | Petrov et al. | |

(Continued)

OTHER PUBLICATIONS

International Search Report and Written Opinion dated Oct. 26, 2015 for PCT Application No. PCT/US2015/045667, 11 pages.

Primary Examiner — Gil H. Lee
Assistant Examiner — Javier O Guzman
(74) Attorney, Agent, or Firm — Kilpatrick Townsend & Stockton LLP (57) ABSTRACT

At least one of a set of topics published by one or more vehicle-located mobile gateways is subscribed to. A set of publication topics is created based on the first set of topics, the publication topics made available to a client. A subscription request is received from the client corresponding to a selected topic of the set of publication topics. First sequential data is received from the one or more mobile gateways in response to the subscription to the at least one of the set of topics of the one or more mobile gateways. Second sequential data is sent to the client responsive to the subscription request, the second sequential data being based on the first sequential data.

16 Claims, 6 Drawing Sheets

(56) References Cited

U.S. PATENT DOCUMENTS

| | | | | |
|---|---|---|---|---|
| 2010/0088372 | A1* | 4/2010 | Shridhar | G06F 21/41 709/204 |
| 2011/0021234 | A1* | 1/2011 | Tibbitts | H04W 48/04 455/517 |
| 2012/0039212 | A1* | 2/2012 | Kaliyaperumal | H04W 88/16 370/254 |
| 2012/0194679 | A1* | 8/2012 | Nehowig | G06F 1/1626 348/148 |
| 2012/0221955 | A1* | 8/2012 | Raleigh | H04M 15/00 715/736 |
| 2012/0324041 | A1* | 12/2012 | Gerber | H04L 67/26 709/217 |
| 2013/0049987 | A1 | 2/2013 | Velusamy | |
| 2013/0084847 | A1* | 4/2013 | Tibbitts | H04W 8/245 455/419 |
| 2013/0104251 | A1* | 4/2013 | Moore | G06F 21/602 726/30 |
| 2013/0138814 | A1* | 5/2013 | Kotecha | H04L 67/10 709/226 |
| 2013/0210464 | A1* | 8/2013 | Mittal | H04L 67/18 455/456.5 |
| 2013/0227119 | A1* | 8/2013 | Simen | H04L 67/24 709/224 |
| 2014/0113619 | A1* | 4/2014 | Tibbitts | G07C 5/008 455/419 |
| 2015/0135087 | A1* | 5/2015 | Verkasalo | H04L 67/125 715/745 |
| 2015/0189620 | A1* | 7/2015 | Metral | H04L 67/26 709/206 |
| 2015/0281374 | A1* | 10/2015 | Petersen | H04L 67/12 709/223 |
| 2015/0334506 | A1* | 11/2015 | Rao | G07C 5/08 455/414.1 |
| 2016/0034158 | A1* | 2/2016 | Livesay | G05B 19/41835 715/736 |

* cited by examiner

VEHICLE DATA SYSTEM UTILIZING PUBLISH/SUBSCRIBE GATEWAYS

RELATED APPLICATIONS

This application claims the benefit of Provisional Patent Application No. 62/038,592, filed on Aug. 18, 2014, to which priority is claimed pursuant to 35 U.S.C. § 119(e) and which is incorporated herein by reference in its entirety.

SUMMARY

The present disclosure is related to vehicle data systems. In one embodiment, method, systems, apparatuses, and computer-readable medium facilitate subscribing to at least one of a set of topics published by one or more vehicle-located mobile gateways. A set of publication topics is created based on the first set of topics, the publication topics made available to a client. A subscription request is received from the client corresponding to a selected topic of the set of publication topics. First sequential data is received from the one or more mobile gateways in response to the subscription to the at least one of the set of topics of the one or more mobile gateways. Second sequential data is sent to the client responsive to the subscription request, the second sequential data being based on the first sequential data.

In another embodiment, method, systems, apparatuses, and computer-readable medium facilitate subscribing to at least one of a set of topics published by a client. The client is associated with a plurality of vehicle-located mobile gateways. A set of publication topics is created based on the first set of topics, the publication topics made available to the mobile gateways. A subscription request is received from at least one of the mobile gateways corresponding to a selected topic of the set of publication topics. First sequential data is received from the client in response to the subscription to the at least one of the set of topics of the client. Second sequential data is sent to the at least one mobile gateway responsive to the subscription request, the second sequential data being based on the first sequential data.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures. The drawings are not necessarily to scale.

DETAILED DESCRIPTION

In general, the disclosure is directed to techniques for utilizing vehicle data. Such data, which may include any data generated by onboard sensors, may be used to manage operation of private or commercial vehicles. In some systems, motor vehicles are equipped with communication devices that communicate data to a data center or other central office system. While the vehicles and/or drivers need not have any association with one another, the vehicles may be part of one or more fleets of vehicles, such as in the trucking industry. The central office may serve as a fleet management system (FMS) in which the trucks or other vehicles communicate, regardless of which fleet, if any, they may be associated with.

The solutions presented herein utilize the data gathered by vehicle sensor systems to provide information to the clients via a cloud gateway. Generally, the cloud gateway is an intermediary between vehicle computers that gather fleet data and end-users of the fleet data. The cloud gateway acts as a message broker that receives, processes, categorizes, and distributes the fleet data. Throughout, the system utilizes a publish/subscribe model to facilitate existing data types as well as providing the ability to add new data types.

Figure 1:
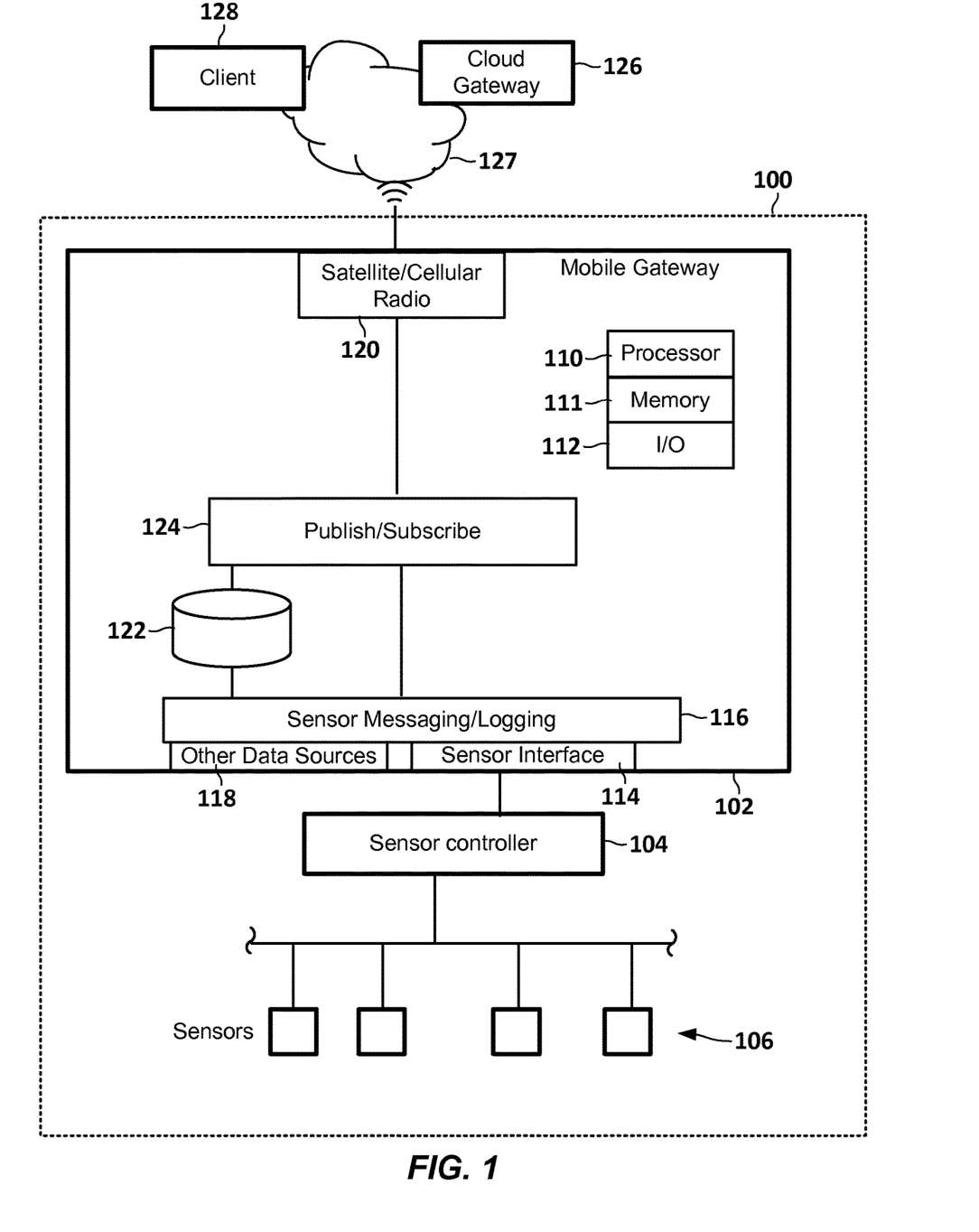
FIG. 1 is a block diagram of a mobile gateway within a vehicle data system according to an example embodiment.

In reference now to FIG. 1, a block diagram illustrates a vehicle data system according to an example embodiment. The confines of a vehicle are generally indicated by dashed line 100, which encompasses a mobile gateway 102, a sensor controller 104, and sensors 106. The mobile gateway 102 serves generally as a data collection and disbursement device, and may include special- or general-purpose computing hardware, as indicated by processor 110, memory 111, and input/output (I/O) circuitry 112. The mobile gateway 102 also includes a sensor interface 114 that may be coupled to external data gathering components such as sensor controller 104. The sensor interface 114 may include data transfer interfaces such as serial port (e.g., RS-232, RS-422, etc.), Ethernet, Universal Serial Bus (USB), etc.

The sensor controller 104 in this example may be configured to read data from vehicle type busses, such as Controller Area Network (CAN). Generally, CAN is a message-based protocol that couples nodes to a common data bus. The nodes utilize bit-wise arbitration to determine which node has priority to transmit onto the bus. The embodiments need not be limited to CAN busses; the sensor controller 104 (or other sensor controllers) can be used to read data from other types sensor coupling standards, such as power-line communication, IP networking (e.g., Universal Plug and Play), I²C bus, Serial Peripheral Interface (SPI) bus, vehicle computer interface, etc. While the sensor controller 104 is shown as external to the mobile gateway 102, it may be incorporated within the mobile gateway 102, e.g., integrated with main board and/or as an expansion board/module.

The sensor controller 104 may act as a pass-through that detects and assembles messages, and queues them for transmission to the sensor interface 114. The sensor controller 104 may include additional capabilities such as determining a type of data encoded in the message, formatting the message data, and adding additional data (e.g., metadata, tags) that facilitate easily interpreting the message data. The sensor controller 104 may also have the ability to detect sensors being added or removed from the existing set of sensors 106. This can dynamically affect the types and amounts of data being transferred to the mobile gateway 102 via the sensor interface 114.

The mobile gateway 102 includes a sensor messaging/logging component 116 that receives sensor data via the sensor interface 114. The messaging/logging component 116 processes various streams of data from the sensor interface 114 (which may include multiple interfaces) and other data sources 118. For purposes of this disclosure, a "stream" or "feed" of data refers to a sequence of data messages on a related subject. As such, the stream/feed may not require a continuous connection or other continuity associated, e.g., with streaming media. Generally, as long as a received message can be correlated associated with other messages received at a different time, these messages may be collectively referred to as a stream or feed.

The other data sources 118 may include data generated/measured by the mobile gateway 102 itself and wireless networks, as indicated by satellite/cellular radio module 120. For example, other data 118 may include data regarding the vehicle (e.g., make, model, year, trailer information), driver identity (e.g., name, ID). This type of data may not significantly change, although may be occasionally updated. Such changes may be communicated to the messaging/logging component 116 after such changes occur, and during other appropriate events, e.g., vehicle start, device boot up, driver login, etc.

The mobile gateway 102 may be able to receive and/or generate messages that encapsulate data that originated from the various sources 114, 118. The messaging/logging component 116 at least classifies the messages and stores the message data in a persistent data store 122. The data store 122 may include a hard drive or flash memory, and the messaging/logging component 116 may process the messages (e.g., compression, discarding of old data) to ensure the data store 122 doesn't become full.

The messaging/logging component 116 may attempt to categorize the data received via the sources and store it appropriately in the data store 122. For example, the data store 122 may include a relational database that stores numeric or text data, and one table of the database may have columns such as TIMESTAMP, DATA_TYPE and DATA, where DATA_TYPE is an enumerated type (e.g., temperature, geolocation, percentage, etc.). However, the DATA_TYPE column may be redundant for large data sets, and instead a different table may be formed for each type of data. Other types of data, such as images, audio, video, may use other storage conventions.

Generally, the messaging/logging component 116 may only need to interpret the incoming data so that it can be efficiently stored, and other components, such as the publish/subscribe component 124, may perform additional interpretations/transformations and/or create more sophisticated representations and categorizations of the data. An example of the former is converting temperature readings from a variety of sensors to a common format, e.g., degrees C. An example of the latter is using sensors that detect fuel flow and speed to derive fuel consumption, both instantaneous consumption and a running average. The running average fuel consumption can be combined with a fuel level sensor to derive a range in miles until fuel is empty. These derived values can also be stored in the data store 122 and/or dynamically calculated as needed.

Besides categorizing data, the publish/subscribe component 124 implements a pattern that is useful for providing customized views of data. In a publish/subscribe model, publishers of messages do not program the messages to be sent directly to subscribers. Instead, published messages are characterized into topics (or named logical channels), without knowledge of what, if any, subscribers there may be. Similarly, subscribers express interest in one or more topics, and only receive messages that are of interest, without knowledge of what, if any, publishers there are.

In the present example, the publish/subscribe component 124 categorizes the vehicle data into appropriate topics, such as telemetry data (e.g., geolocation, speed, altitude, direction.), engine data (e.g., coolant temperature, generator voltage, airflow, engine speed), cargo data (e.g., temperature, vibration), etc. The list of topics may expand or contract based on sensors detected via the sensor controller 104. For example, if a rear-view camera is added, the feed (either static images or video) can be added to one or more topics, such as telemetry data, and/or have its own topic created, e.g., "on-board video."

Subscribers in a topic-based system may receive some or all messages published to the topics to which they subscribe, and all subscribers to a topic may receive the same messages. Customizations may be used (e.g., filters) that allow blocking certain messages on a particular topic. The publisher defines the classes of messages to which subscribers can subscribe, and associate those messages with the various topics as appropriate. Thereafter, a mechanism such as HTTP, syndication feed, email, etc., may be used to send out the messages via a wide area network 127 (e.g., cellular networks, satellite networks, Wi-Fi®, the Internet). This results in dynamic presentation of the sensor data, e.g., a time varying view of data that may be in real-time or near-real time.

The publish/subscribe component 124 may be part of a wider publish/subscribe system of a fleet management system. For example, a cloud gateway 126 is an infrastructure middleware service that subscribes to a set of messages from the mobile gateway 102 via the wide area network 127. These messages are stored and may be further processed by the cloud gateway 126. Clients 128 include subscribers such as fleet management services, customers, and third parties, and subscribe to the messages via a publish/subscribe service of the cloud gateway 126. The cloud gateway 126 may aggregate similar messages from a large number of vehicles, providing an overall picture of fleet activity, for example. The aggregation may involve statistical values (e.g., averages, medians) and may involve other forms of data processing sometimes associated with time or location varying data, such as smoothing, interpolation, extrapolation, prediction, etc.

The publish/subscribe component 124 of the individual mobile gateways 102 assists in implementing features of the cloud gateway 126. For example, the publish/subscribe component 124, either automatically or with minimal configuration, can handle new types of sensor data (or new transformations and combinations of existing sensor data) by adding a new topic. The cloud gateway 126 can add this to its subscription from the mobile gateway 102 using well-established subscription protocols, and similarly publish the information to other entities. The client 128 can discover and use these newly published data sources with minimal end-to-end configuration effort.

Figure 2:
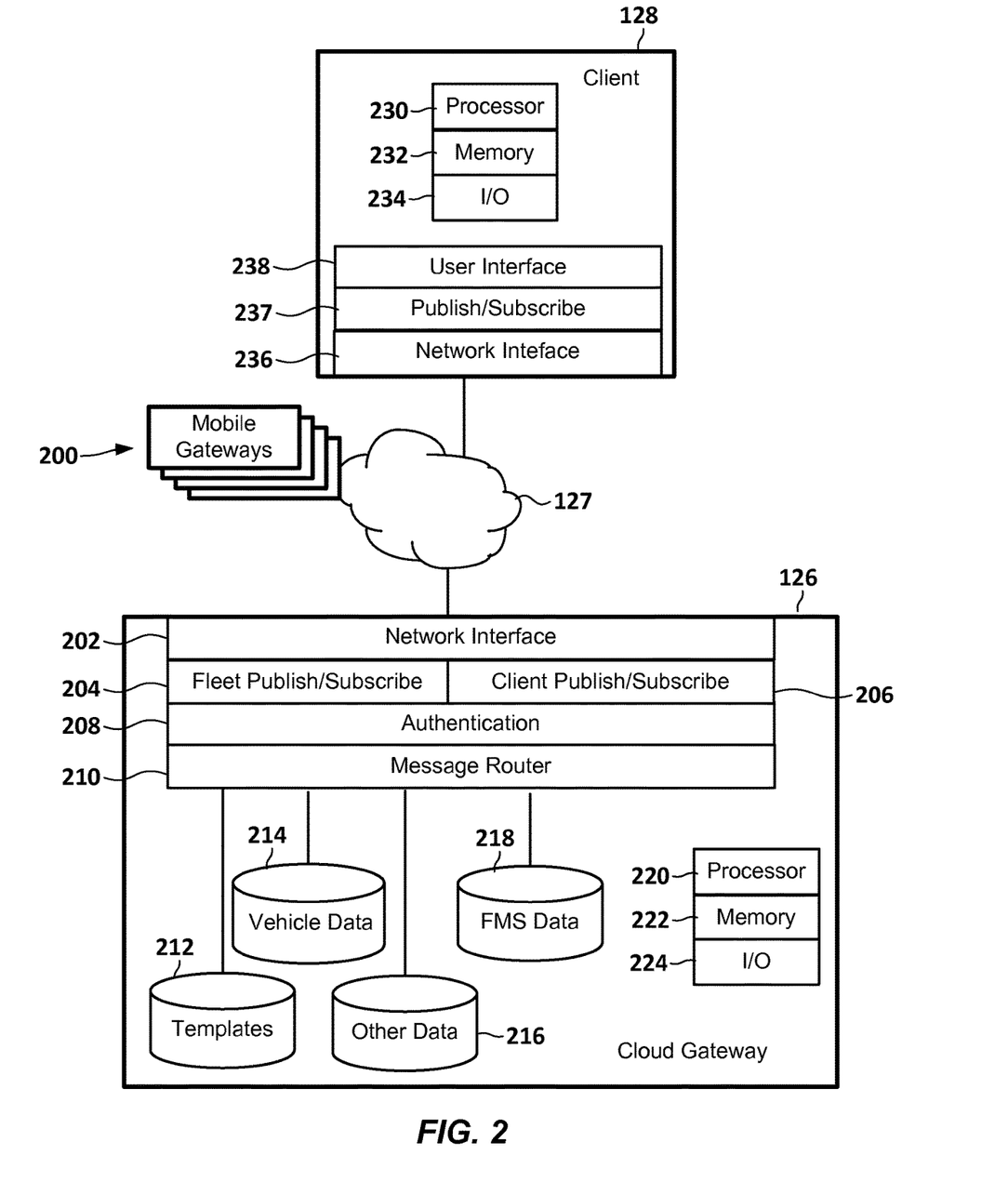
FIG. 2 is a block diagram of a cloud gateway and client within the vehicle data system.

In reference now to FIG. 2, a block diagram illustrates details of the cloud gateway 126 and client 128 in a system according to an example embodiment. The system includes mobile gateways 200, at least some of which may be configured as mobile gateway 102 shown in FIG. 1. In some embodiments, the mobile gateways 200 may include a different arrangement, e.g., without analogous publish/subscribe features. These different mobile gateways 200 may still be integrated with the cloud gateway 126 and client 128 as will be described in greater detail below.

The cloud gateway 126 includes a network interface 202 which includes hardware capable of communicating over the wide area network 127. The network interface 202 may include an Ethernet adapter that is coupled to local network switches (e.g., as part of a data center local area network) and accesses the wide area network 127 via an Internet gateway (not shown). Communications with the mobile gateways are managed via a fleet publish/subscribe component 204. For mobile gateways 200 that have a corresponding publish/subscribe interface (e.g., component 124 in FIG. 1), the fleet publish/subscribe component 204 may utilize a similar set of protocols to discover published topics and subscribe to a selected set of those topics.

As noted above, a subset of the mobile gateways 200 may not have a publish/subscribe component corresponding to fleet publish/subscribe component 204. One way of dealing with this is to create a proxy (not shown) that operates on the cloud gateway 126 or similar infrastructure computer. The proxies may have a proprietary interface that interacts with the mobile gateway via the wide area network 127 and a publish/subscribe interface operating on the cloud gateway 126. In another arrangement, similar proxies may be located with the mobile gateways 200. The proxy can gather data from the respective mobile gateway using local data connection and provide a publish/subscribe interface similar to component 124 in FIG. 1.

A client publish/subscribe component 206 publishes topics available to the client 128, and allows the client 128 to subscribe to topics and receive data included with the topics, e.g., data streams, sequentially transmitted messages, etc. An authentication component 208 may handle authentication of both mobile gateways 200 and clients 128. Authentication may involve positively determining the identity of a gateway or client, and limiting access to data based on that identity. For example, if a client 128 used by a manager of a trucking company, the client 128 should not be able to access mobile gateway data from other trucking companies.

Similar authentication-based restrictions may be placed on the mobile gateways 200, including potentially restricting access to data of other vehicles even if the other vehicle is associated with the same client. Such authentication may be based on a hardware identifier of the mobile gateways 200 and/or an identity (e.g., login credentials) of occupants currently signed into the mobile gateways 200. For example, upon starting the vehicle, the driver may log into the mobile gateway, thereby providing authentication and permissions that will be used by the mobile gateway when accessing the cloud gateway 126. Authentication methods known the art may be used by the authentication component 208, including passwords, hardware specific keys, two-factor authentication, etc. The authentication may be based on particular hardware and/or personal credentials, and may coordinate with corresponding authentication components on the mobile gateways 200 and client 128.

A message router 210 routes messages between the mobile gateways 200 and clients 128 based on subscriptions. The available subscriptions may be limited by authentication of the client 128. For example, as previously noted, a client 128 may only be allowed access to data from mobile gateways 200 that the client 128 has specific authentication to access. This type of authentication may be stored in an FMS database 218, for example, that maps fleet vehicle to client accounts. The segregation of data by client may also extend to a vehicle database 214 that stores data obtained from mobile gateways 200. Such data storage may be needed at least for buffering, and may also be used to store data long-term, e.g., for historical analysis. The structure of the vehicle database 214 may be such that particular database permissions are needed to access data structures (e.g., tables) that store data from a grouped set of mobile gateways 200, e.g., set of gateways that belong to a fleet.

In order to more efficiently manage data, the message router 210 may use a database of stored templates 212 to determine particular formats and protocols used by particular clients 128. Such the templates 212 may define, e.g., user interface appearance, frequency of updates of data, units of measure, caching/storage policies, access policies, client and mobile gateway account credentials, etc. The client publish/subscribe module 206 may include remote user access to set these policies and preferences, which can then be stored with the templates 212.

The message router 210 may also utilize other data 216 that can be sent to mobile gateways 200 and/or clients 128. For example, system status messages may originate from an operator of the cloud gateway 126 and be pushed out to mobile gateways 200 and/or clients 128. Other data of interest may be gathered from third parties, such as traffic management data, weather information, travel restrictions, government alerts, network status/outages, etc. Such other data 216 may be filtered based on other aspects besides subscriptions, such as time and location.

The functionality of the cloud gateway 126 can be implemented using conventional computing hardware, as indicated by processor 220, memory 222, and input/output circuitry (I/O) 224. Generally, the functional components 202, 204, 206, 208, 210 may be implemented at least in part via software operable on the processor 220. The functions of the cloud gateway 126 may be distributed across multiple computers, e.g., via a clustered computing arrangement. The client 128 may also include conventional computing hardware such as a processor 230, memory 232, and I/O 234, and may include functional modules such as network interface 236, publish/subscribe interface 237, and user interface 238.

The network interface 236 may include commonly available hardware and software, e.g., Ethernet network interface and a network-capable operating system. The publish/subscribe interface 237 and user interface 238 may be custom software components and/or use existing software such as a web browser, email client, text messaging client, etc. The publish/subscribe interface 237 interacts with the client publish/subscribe component 206 of the cloud gateway 126 to subscribe the client 128 to various data feeds from the mobile gateways 200. Similarly, the client 128 can publish data (e.g., dispatch messages) that can be subscribed to by the client publish/subscribe component 206, and the mobile gateways 200 can in turn subscribe to the data via the fleet publish/subscribe service.

The publish/subscribe model has a number of features that make it useful in the illustrated system. The published topics are extensible, such that new topics can be added and discovered using standard service discovery protocols. Other entities can subscribe to these new topics and receive data feeds in response. The actual form of the data provided by the mobile gateways 200 may not be in a form that is easily usable by the client 128, and so the cloud gateway 126 can assist in providing custom data views, feed rates, and formats that are adapted for particular client needs. An example of such an interaction is shown in the sequence diagram of FIG. 3.

Figure 3:
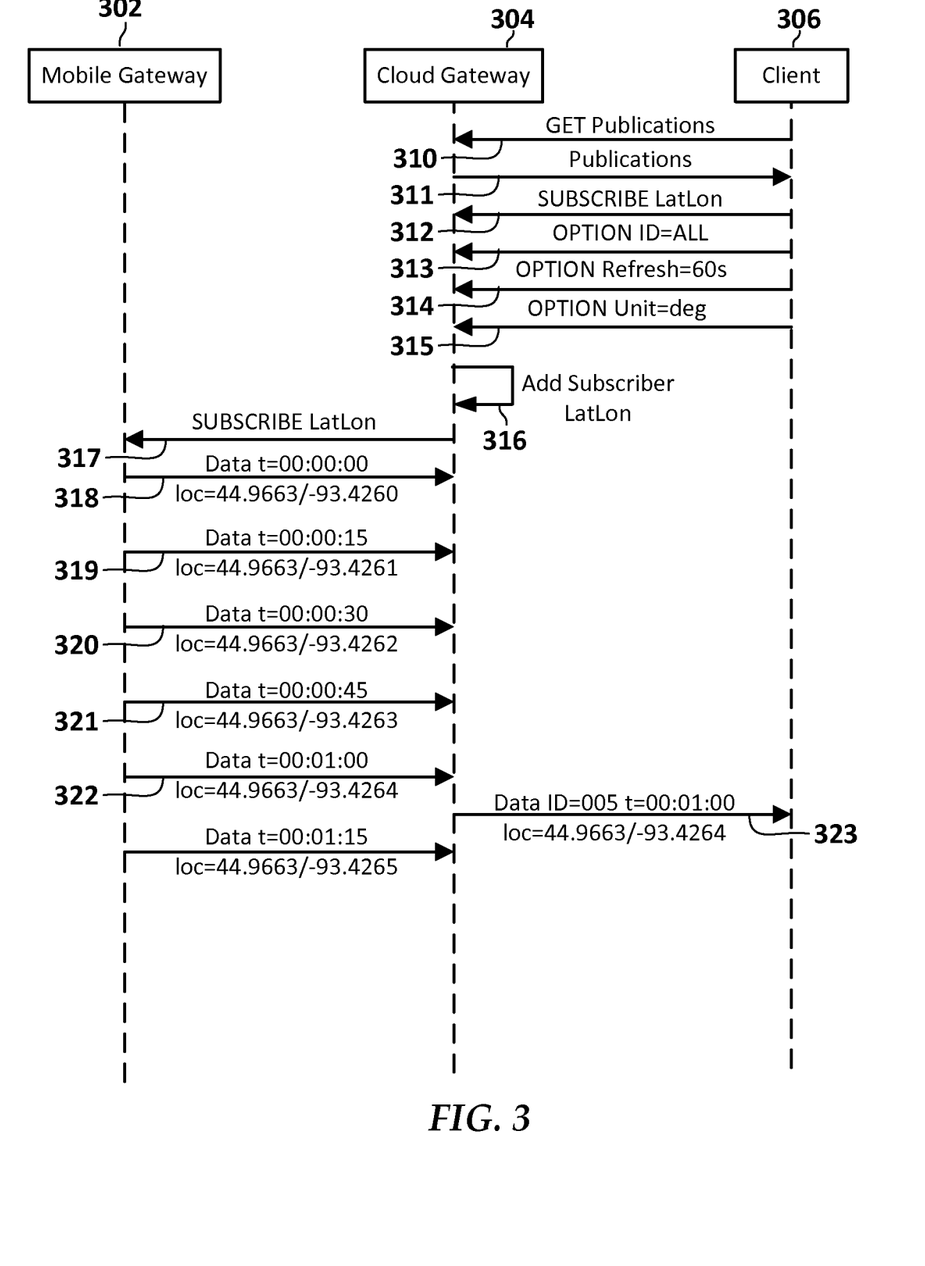
FIGS. 3-4 are sequence diagrams illustrating operation of a vehicle data system according to example embodiments.

In the sequence diagram of FIG. 3, a client 306 subscribes to a location service of a mobile gateway 302 via a cloud gateway 304. The client 306 sends a request 310 to obtain a list 311 of published topics of the cloud gateway 304. The request 310 may contain parameters, e.g., a certain class of vehicle, so that the list 311 is filtered. The list 311 may be automatically filtered based on permissions of the client 306, such that only data available on mobile gateways associated with the client 306 can be seen as published.

In this example, one published topic is LatLon, which is a location feed from the mobile gateway 302, e.g., provided via a Global Positioning Satellite (GPS) receiver. The subscription request also includes options 312-315, which may define aspects of the subscribed data. These aspects may include, among other things, the mobile gateway IDs from which to receive data, refresh time, unit of measure, destination address/port for the data, protocol used to send the data, etc. In this example, the option 313 selects all available mobile gateways, which includes the illustrated mobile gateway 302. There may be additional communications associated with the subscription that are left out for clarity, such as acknowledgement of the request, providing an identifier that can later be used to cancel the subscription. The cloud gateway 304 then adds 316 the subscription to its list.

The cloud gateway 304 also subscribes 317 to the corresponding LatLon topic of the mobile gateway 302. This subscription 317 may have already occurred, e.g., by default for certain classed of data. The subscription 317 may include options similar to those requested by the client 306, although in this case a default set of options may be used, and/or a system-wide set of options may have been defined by the client or other operator. For example, the refresh rate of data from the mobile gateway 302 is set here as once every 15 seconds, whereas option 314 requests a refresh rate of 1 minute. In this case, the cloud gateway 304 may have other data collection tasks that require a higher refresh rate, or such collection rates may be part of a contract or agreement.

Thereafter, the mobile gateway sends out location updates 318-322 until one minute has passed, and then the update 322 is copied as an update message 323 sent to the client 306. The copied message 323 may contain additional and/or transformed data based on the subscription options. In this case, an ID of the mobile gateway 302 is added, so that the client 306 can distinguish between multiple mobile gateways. While this example shows a reduction in the refresh rate of location updates, the cloud gateway 304 may be configured to increase a rate of updates in some cases. For example, a location may be extrapolated based on recent history and sent out to the client 306 more frequently. In another example, other vehicle data such as current route and speed can be used to predict current location based on a last location update, thereby increasing the refresh rate of location data over that received from the mobile gateway 302.

In the example of FIG. 3, there is a one-to-one correspondence between the client-to-cloud subscription and cloud-to-mobile subscription. In other cases, multiple data streams may be combined into one and associated with customized subscriptions. For example, an estimated fuel range subscription by a client may use additional data to refine the estimate. Generally, range involves determining current average consumption and amount of fuel remaining. However, other factors, such as weather, elevation changes, reduced weight of consumed fuel, temperature, traffic conditions, can alter this estimate. As such, a fuel range feed sent to a client may combine sensor feeds from the vehicle as well as third party data (e.g., elevation changes along current route) to provide an improved estimate. In other cases, a single stream may be divided into multiple streams. As an example of this, a GPS feed from the mobile gateway may contain latitude, longitude, and altitude measurements, along with other data (e.g., visible satellites). A portion of this data can be broken out into separate feeds, e.g., LatLon, Altitude, etc.

While the example in FIG. 3 shows subscription data moving from the left to the right, the publication/subscription model allows subscriptions to go both directions in the same or similar manner. An example of this is shown in the sequence diagram of FIG. 4. In this example, it is assumed the client 306 provides a custom service that aggregates information sources to determine traffic incidents that could delay deliveries. This information is sent out to vehicles via the mobile gateways, but needs to be filtered based on location to reduce driver distraction. Further, it may be desirable to filter via the cloud gateway 304, to reduce traffic between the cloud gateway 304 and mobile gateways.

Figure 4:
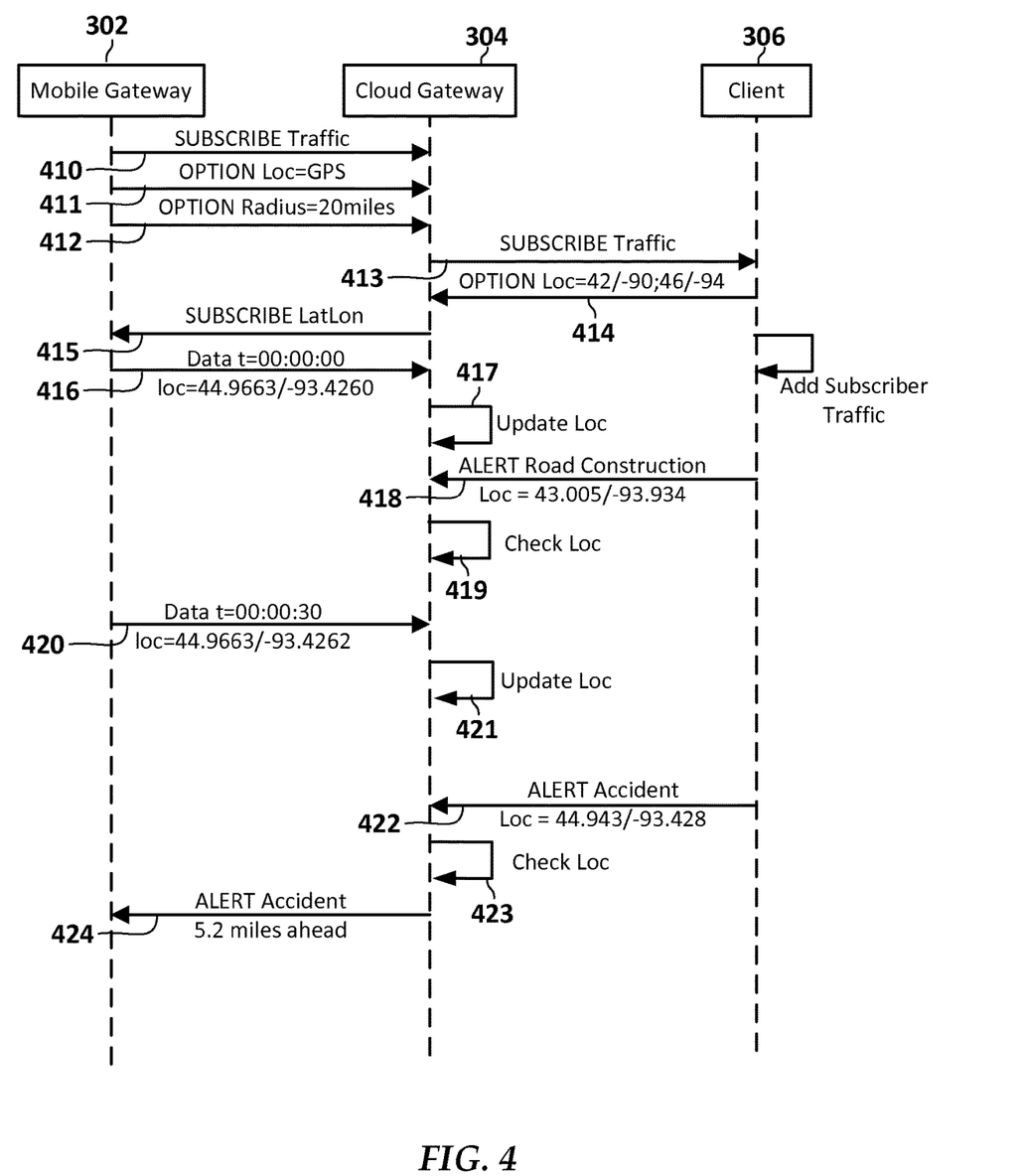

The process begins by mobile gateway subscribing 410 to the Traffic topic. Additional options 411, 412 include defining that the location is to be determined via the vehicles GPS and to limit the radius of reporting within to 20 miles of the GPS location. In this example, the cloud gateway 304 subscribes 413 to the Traffic topic, and also sets the location to a relatively large region via option 414. This region may be large enough to encompass a day's travel of this and other monitored vehicles, and may be occasionally updated based on new mobile gateway subscriptions or vehicles approaching the boundary.

In order to filter the traffic messages, the cloud gateway 304 subscribes 415 to the location topic of the mobile gateway 302. Based on a vehicle location message 417, the cloud gateway 304 updates 417 a local record of the vehicle's location. Thereafter, when a traffic alert message 418 is received, a location associated with the message 418 is checked 419 versus the last mobile gateway location. In this case, the message location is outside the area of interest, and no alert is sent to the mobile gateway 302. After location updates 420, 421 occur, another alert 422 is received, which is checked 423 against the mobile gateway location. In this case, the location is within the area of interest of the vehicle, and so a forwarded message 424 is sent to the mobile gateway 302. In this example, the message 424 is customized for context of the end user, e.g., stating a relative location along the current route. This determination may be made at the cloud gateway 304 based on other data provided by mobile gateway 302, and/or may be modified locally by the mobile gateway.

The example shown in FIG. 4 may be extended to any set of vehicle and client data. For example, the vehicle fuel level may be sent from the mobile gateway 302 to the cloud gateway 304 similar to location. When the fuel level reaches a certain threshold, a message could be sent to the mobile gateway 302 from the client 306 via the cloud gateway 304. The message may include a list of approved stations within range of the vehicle, and locations of the stations may be used, e.g., as input to a navigation system of the vehicle.

Figure 5:
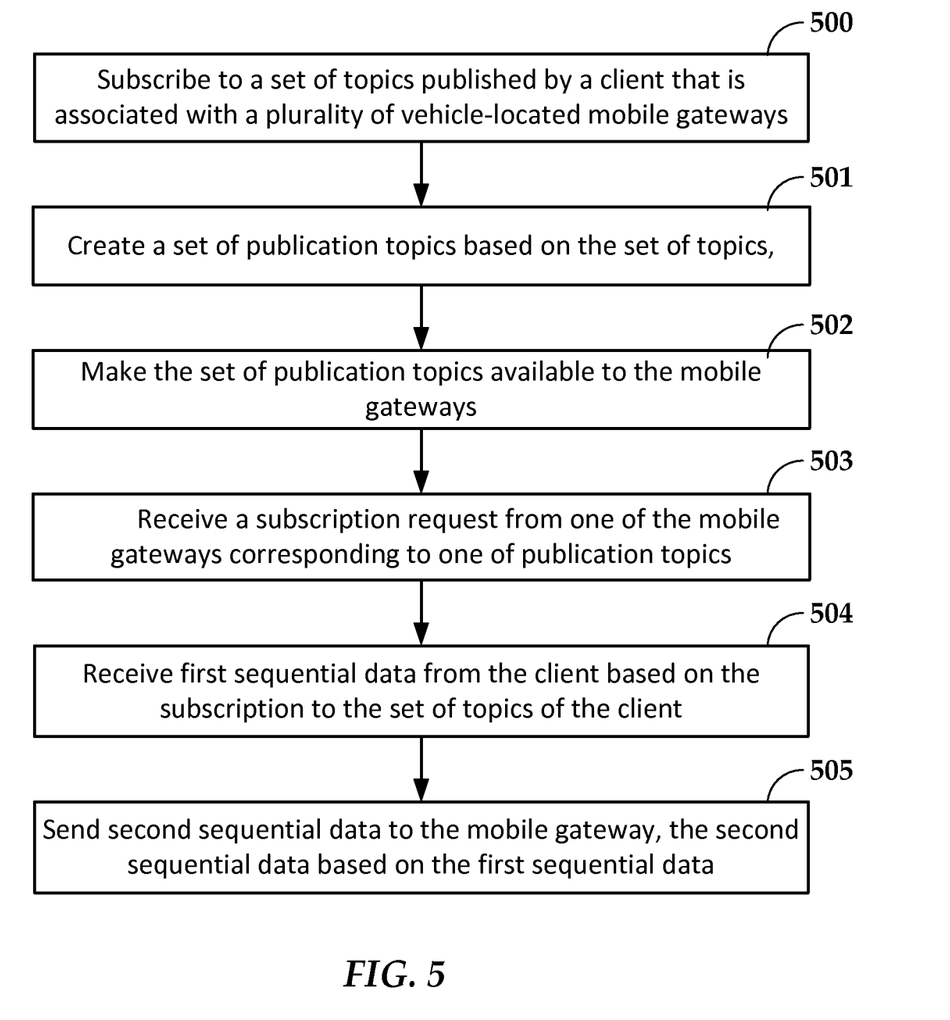
FIGS. 5-6 are flowcharts illustrating methods according to example embodiments.

In reference now to FIG. 5, a flowchart shows a method according to an example embodiment. The method involves subscribing 500, via a wide area network, to at least one of a set of topics published by a client that is associated with a plurality of vehicle-located mobile gateways. A set of publication topics is created 501 based on the first set of topics, and the publication topics are made available 502 to the mobile gateways via the wide area network. A subscription request is received 503 from one of the mobile gateways via the wide area network. The request corresponds to a selected topic of the set of publication topics. First sequential data is received 504 from the client in response to the subscription to the at least one of the set of topics of the client. Responsive to the subscription request, second sequential data is sent 505 to the mobile gateway via the wide area network. The second sequential data is based on the first sequential data.

The method shown in FIG. 5 may involve other operations that are not shown, such as subscribing to a second set of topics published by the at least one mobile gateway, and receive sequential vehicle data (e.g., location) in response thereto. In such a case, the second sequential data can be filtered based on the sequential vehicle data. In another example, the method may further involve authenticating an identity of the at least one mobile gateway, and controlling access to the second sequential data according to the identity of the at least one mobile gateway. In such a case, the set of publication topics made available to the at least one mobile gateway may be filtered based on the identity of the at least one mobile gateway. The identity of the mobile gateway may be based on the identity of a vehicle occupant, e.g., one that authenticates via the mobile gateway.

Figure 6:
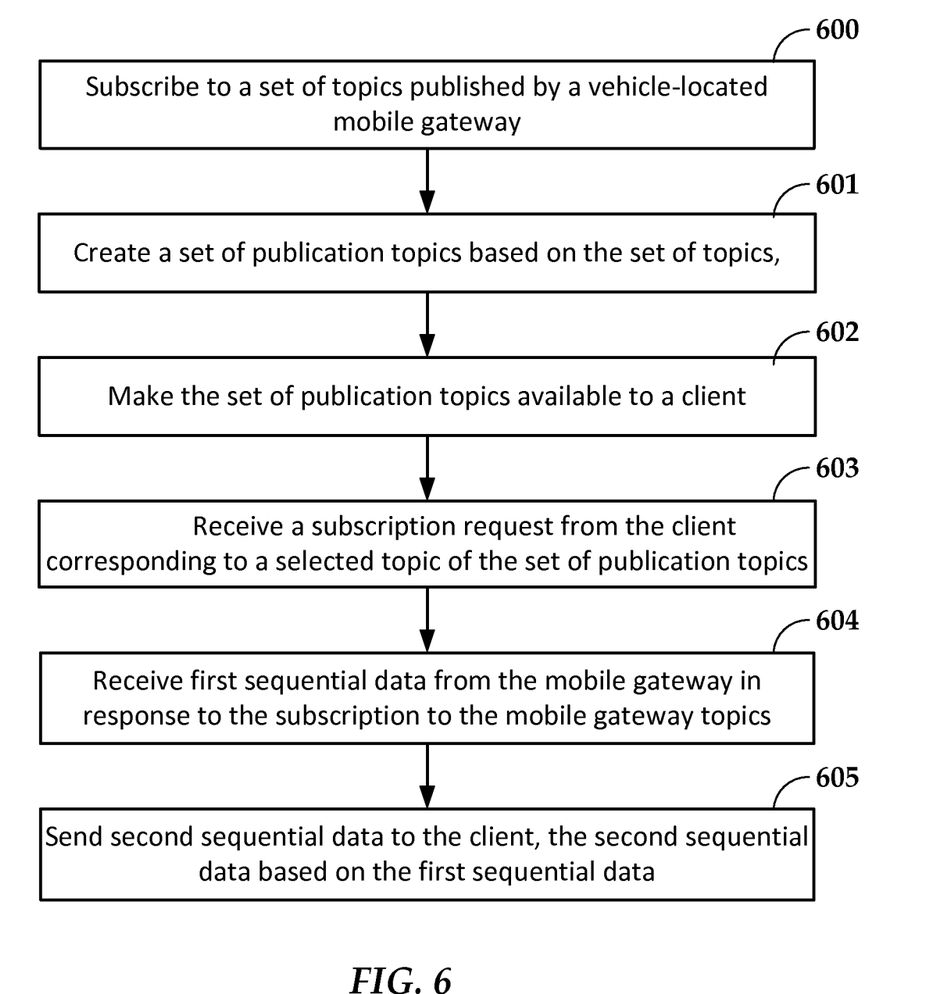

In reference now to FIG. 6, a flowchart shows a method according to an example embodiment. The method involves subscribing 600 to at least one of a set of topics published by one or more vehicle-located mobile gateways via a wide area network. A set of publication topics is created 601 based on the first set of topics, and the publication topics are made available 602 to a client via the wide area network. A subscription request is received 603 from the client via the wide area network. The request corresponds to a selected topic of the set of publication topics. The request may include options (e.g., refresh rate, unit of measure, mobile gateway identifier) defining aspects of the data and delivery thereof, the second set of data modified to conform to the options.

First sequential data (e.g., vehicle sensor data) is received 604 from the one or more mobile gateways in response to the subscription to the at least one of the set of topics of the one or more mobile gateways. Responsive to the subscription request, second sequential data is sent 605 to the client via the wide area network. The second sequential data is based on the first sequential data. For example, the second sequential data may include a combination of data from two or more topics. The method shown in FIG. 6 may involve other operations that are not shown, such as authenticating an identity of the client, and controlling access to the second sequential data according to the identity of the client.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts or other diagrams presented herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A cloud gateway comprising:
    a network interface configured to communicate via a wide area network; and
    a processor coupled to the network interface and configured to, via the wide area network:
        subscribe to at least one of a set of topics published by one or more vehicle-located mobile gateways;
        create publication topics based on the set of topics, the publication topics made available to a client, wherein the client is not located in one of the respective vehicles, and wherein the client includes at least one computing device associated with a subscriber including at least one of a fleet management service, customer, or third party;
        receive a subscription request from the client corresponding to a selected topic of the publication topics;
        receive first sequential data indicative of a vehicle status from the one or more mobile gateways in response to the subscription to the at least one of the set of topics of the one or more mobile gateways, wherein the first sequential data includes a first sequence of messages comprising data from a plurality of sensors coupled to a vehicle;
        authenticate access to at least some of the first sequential data by the client based on an identity of the client and an identity of at least one of the one or more vehicle-located mobile gateways;
        generate second sequential data responsive to the subscription request received from the client and based on the authenticated access by the client, wherein the second sequential data is based on the first sequential data and includes a second sequence of messages, at least some of the second sequence of messages comprising data determined using the data from at least two of the plurality of sensors coupled to the vehicle: and
        send the second sequential data to the client wherein the second sequential data are different from the first sequential data, and wherein the second sequential data are indicative of the vehicle status;
        wherein the second sequential data are sent to the client at a predetermined rate, and the first sequential data are received from the one or more mobile gateways at a rate different from the predetermined rate.

2. The cloud gateway of claim 1, wherein the at least one of the set of topics comprises two or more topics, the second sequential data comprising a combination of data from the two or more topics.

3. The cloud gateway of claim 1, wherein the subscription request includes options that define aspects of the second sequential data, the processor modifying the second sequential data to conform to the options.

4. The cloud gateway of claim 3, wherein the options comprise a refresh rate of the second sequential data.

5. The cloud gateway of claim 3, wherein the options comprise a unit of measure of the second sequential data.

6. The cloud gateway of claim 3, wherein the options comprise an identifier of a selected set of the mobile gateways, wherein the second sequential data is based only on the first sequential data originating from the selected set of the mobile gateways.

7. The cloud gateway of claim 1, wherein the publication topics made available to the client are filtered based on the identity of the client.

8. The cloud gateway of claim 1, wherein the first sequential data comprises data measured via the plurality of sensors coupled to the vehicle.

9. A cloud gateway comprising:
    a network interface configured to communicate via a wide area network; and
    a processor coupled to the network interface and configured to, via the wide area network:
        subscribe to at least one of a first set of topics published by a client, the client being associated with a plurality of vehicle-located mobile gateways, wherein the association between the client and the plurality of vehicle-located mobile gateways is mapped and the mapping is accessible by the processor, and wherein the client includes at least one computing device associated with a subscriber including at least one of a fleet management service, customer, or third party;

create publication topics based on the first set of topics, the publication topics made available to the plurality of vehicle-located mobile gateways;

receive a first subscription request from a first mobile gateway of the plurality of vehicle-located mobile gateways corresponding to a selected topic of the publication topics;

receive a second subscription request from a second mobile gateway of the plurality of vehicle-located mobile gateways corresponding to the selected topic of the publication topics;

subscribe to a second set of topics published by the first mobile gateway and the second mobile gateway;

receive first sequential vehicle data in response to the subscription to the second set of topics published by the first mobile gateway, the first sequential vehicle data comprising first data from sensors coupled to a first vehicle;

receive second sequential vehicle data in response to the subscription to the second set of topics published by the second mobile gateway, the second sequential vehicle data comprising second data from sensors coupled to a second vehicle;

receive first sequential data from the client in response to the subscription to the at least one of the first set of topics of the client;

authenticate access to at least some of the first sequential data by the first mobile gateway and the second mobile gateway based on the mapping of the first mobile gateway and the second mobile gateway to the client;

filter the first sequential data from the client based on the first sequential vehicle data received from the first mobile gateway to provide first filtered sequential data:

send second sequential data to the first mobile gateway responsive to the first subscription request and based on the authenticated access by the first mobile gateway, wherein the second sequential data are different from the first sequential data, and wherein the second sequential data are based on the first filtered sequential data and the first sequential vehicle data received from the first mobile gateway;

filter the first sequential data from the client based on the second sequential vehicle data received from the second mobile gateway to provide second filtered sequential data; and send third sequential data to the second mobile gateway responsive to the second subscription request and based on the authenticated access by the second mobile gateway, wherein the third sequential data are different from and the first sequential data, wherein the third sequential data are based on the first second filtered sequential data received from the client and the second sequential vehicle data received from the second mobile gateway, and wherein the third sequential data are different from the second sequential data.

10. The cloud gateway of claim 9, wherein the first sequential vehicle data comprises location data of the first vehicle, and the second sequential vehicle data comprises location data of the second vehicle.

11. The cloud gateway of claim 9, wherein the publication topics made available to the plurality of vehicle-located mobile gateways are filtered based on an identity of at least the first mobile gateway and the second mobile gateway.

12. The cloud gateway of claim 9, wherein at least one mobile gateway performs authentication to determine a user identity of an occupant of a vehicle associated with the at least one mobile gateway, wherein an identity of the at least one mobile gateway is based on the identity of the occupant.

13. A method comprising:
subscribing to at least one of a set of topics published by one or more vehicle-located mobile gateways via a wide area network;

creating publication topics based on the set of topics, the publication topics made available to a client via the wide area network, wherein the client is not located in one of the respective vehicles, and wherein the client includes at least one computing device associated with a subscriber including at least one of a fleet management service, customer, or third party;

receiving, via the wide area network, a subscription request from the client corresponding to a selected topic of the publication topics;

receiving, via the wide area network, first sequential data indicative of a vehicle status from the one or more mobile gateways in response to the subscription to the at least one of the set of topics of the one or more mobile gateways, wherein the first sequential data includes a first sequence of messages comprising data from a plurality of sensors coupled to a vehicle;

authenticating access to at least some of the first sequential data by the client based on an identity of the client and an identity of at least one of the one or more vehicle-located mobile gateways;

generating second sequential data responsive to the subscription request received from the client and based on the authenticated access by the client, wherein the second sequential data is based on the first sequential data and includes a second sequence of messages, at least some of the second sequence of messages comprising data determined using the data from at least two of the plurality of sensors coupled to the vehicle; and sending the second sequential data to the client via the wide area network, wherein the second sequential data are different from the first sequential data, and wherein the second sequential data are indicative of the vehicle status;

wherein the second sequential data are sent to the client at a predetermined rate, and the first sequential data are received from the one or more mobile gateways at a rate different from the predetermined rate.

14. The method of claim 13, wherein the subscription request includes options that define aspects of the second sequential data, the method further comprising modifying the second sequential data to conform to the options.

15. The method of claim 14, wherein the options comprise at least one of a refresh rate of the second sequential data and a unit of measure of the second sequential data.

16. A method comprising:
subscribing to at least one of a first set of topics published by a client via a wide area network, the client being associated with a plurality of vehicle-located mobile gateways, wherein the association between the client and the plurality of vehicle-located mobile gateways is mapped, and wherein the client includes at least one computing device associated with a subscriber including at least one of a fleet management service, customer, or third party;

creating publication topics based on the first set of topics, the publication topics made available to the plurality of vehicle-located mobile gateways via the wide area network;

receiving, via the wide area network, a first subscription request from a first mobile gateway of the plurality of vehicle-located mobile gateways corresponding to a selected topic of the publication topics;

receiving, via the wide area network, a second subscription request from a second mobile gateway of the plurality of vehicle-located mobile gateways corresponding to the selected topic of the publication topics;

subscribing, via the wide area network, to a second set of topics published by the first mobile gateway and the second mobile gateway;

receiving, via the wide area network, first sequential vehicle data in response to the subscription to the second set of topics published by the first mobile gateway, the first sequential vehicle data comprising first data from sensors coupled to a first vehicle;

receiving, via the wide area network, second sequential vehicle data in response to the subscription to the second set of topics published by the second mobile gateway, the second sequential vehicle data comprising second data from sensors coupled to a second vehicle;

receiving, via the wide area network, first sequential data from the client in response to the subscription to the at least one of the first set of topics of the client;

authenticating access to at least some of the first sequential data by the first mobile gateway and the second mobile gateway based on the mapping of the first mobile gateway and the second mobile gateway to the client;

filtering the first sequential data from the client based on the first sequential vehicle data received from the first mobile gateway to provide first filtered sequential data;

sending second sequential data to the first mobile gateway via the wide area network responsive to the first subscription request and based on the authenticated access by the first mobile gateway, wherein the second sequential data are different from the first sequential data, and wherein the second sequential data are based on the first filtered sequential data and the first sequential vehicle data received from the first mobile gateway;

filtering the first sequential data from the client based on the second sequential vehicle data received from the second mobile gateway to provide second filtered sequential data; and sending third sequential data to the second mobile gateway via the wide area network responsive to the second subscription request and based on the authenticated access by the second mobile gateway, wherein the third sequential data are different from the first sequential data, wherein the third sequential data are based on the second filtered sequential data received from the client and the second sequential vehicle data received from the second mobile gateway, and wherein the third sequential data are different from the second sequential data.

\* \* \* \* \*